(12) United States Patent
Maso et al.

(10) Patent No.: US 11,723,007 B2
(45) Date of Patent: Aug. 8, 2023

(54) METHODS AND APPARATUSES FOR DIFFERENTIATING BETWEEN USER EQUIPMENT

(71) Applicant: Nokia Technologies Oy, Espoo (FI)

(72) Inventors: Marco Maso, Issy les Moulineaux (FR); Axel Mueller, Paris (FR); Nhat-Quang Nhan, Reims (FR); Karri Markus Ranta-Aho, Espoo (FI); Amir Mehdi Ahmadian Tehrani, Karlsfeld (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 144 days.

(21) Appl. No.: 17/214,208

(22) Filed: Mar. 26, 2021

(65) Prior Publication Data

US 2022/0312415 A1  Sep. 29, 2022

(51) Int. Cl.
*H04L 12/28* (2006.01)
*H04W 72/0453* (2023.01)
*H04W 72/044* (2023.01)
*H04J 1/16* (2006.01)

(52) U.S. Cl.
CPC ... *H04W 72/0453* (2013.01); *H04W 72/0473* (2013.01)

(58) Field of Classification Search
CPC ........ H04L 2027/0026; H04W 52/325; H04W 72/0453; H04W 74/0833; H04W 72/51; H04W 72/0473; H04W 52/18; H04W 52/367

USPC ................. 370/252, 329, 430, 386
See application file for complete search history.

(56) References Cited

U.S. PATENT DOCUMENTS

| | | | | |
|---|---|---|---|---|
| 2013/0022019 A1* | 1/2013 | Han | ............. | H04L 5/0007 370/329 |
| 2016/0044606 A1* | 2/2016 | Yin | ............. | H04W 52/146 455/450 |
| 2019/0007923 A1* | 1/2019 | Blankenship | ......... | H04L 5/0073 |
| 2021/0306121 A1* | 9/2021 | Fröberg | ............. | H04L 5/0039 |
| 2021/0392674 A1* | 12/2021 | Abotabl | ............. | H04L 1/0003 |

OTHER PUBLICATIONS

"3rd Generation Partnership Project;Technical Specification Group Radio Access Network; NR;Physical layer procedures for control (Release 16)", 3GPP TS 38.213, V16.4.0, Dec. 2020, pp. 1-181.

(Continued)

*Primary Examiner* — John Pezzlo
(74) *Attorney, Agent, or Firm* — Squire Patton Boggs (US) LLP

(57) ABSTRACT

Systems, methods, apparatuses, and computer program products for differentiating between user equipment, having different capabilities are provided. One method may include transmitting, by a user equipment, a first transmission to a network node. The method may include indicating at least one type of the user equipment. For example, the indicating may include at least one of transmitting the first transmission on a frequency resource that has been modified in frequency domain from an allocated frequency resource by a shifting factor, and/or transmitting the first transmission on the allocated frequency resource and power scaling at least one resource element of the allocated resource.

18 Claims, 4 Drawing Sheets

(56) References Cited

OTHER PUBLICATIONS

"3rd Generation Partnership Project;Technical Specification Group Radio Access Network; NR;Physical layer procedures for data (Release 16)", 3GPP TS 38.214, V16.4.0, Dec. 2020, pp. 1-169.

"Feature Lead Summary on support of Type A Pusch Repetitions for Msg3", 3GPP TSG RAN WG1 #104-e, R1-2102226, Agenda : 8.8.3, Moderator (ZTE Corporation), Jan. 25-Feb. 5, 2021, pp. 1-78.

"Type A Pusch repetitions for Msg3", 3GPP TSG RAN WG1 #104-e, R1-2101225, Agenda : 8.8.3, Samsung, Jan. 25-Feb. 5, 2021, pp. 1-4.

"Type-A PUSCH repetition for Msg3", 3GPP TSG-RAN WG1 Meeting #104e, R1-2101481, Agenda: 8.8.3, Qualcomm Incorporated, Jan. 25-Feb. 5, 2021, 4 pages.

\* cited by examiner

METHODS AND APPARATUSES FOR DIFFERENTIATING BETWEEN USER EQUIPMENT

FIELD

Some example embodiments may generally relate to wireless technologies including mobile or wireless telecommunication systems, such as Long Term Evolution (LTE) or fifth generation (5G) radio access technology or new radio (NR) access technology, and Wi-Fi or short range radios, or other communications systems. For example, certain example embodiments may generally relate to systems and/or methods for differentiating between user equipment (UEs) having different capabilities, such as legacy and new user equipment (UE), for instance.

BACKGROUND

Examples of wireless technologies may include mobile or wireless telecommunication systems, such as the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Other examples of wireless technologies may include Wi-Fi and short range radios, for instance.

SUMMARY

An embodiment may be directed to a method, which may include transmitting, by a user equipment, a first transmission to a network node, and indicating at least one type of the user equipment. The indicating may include at least one of transmitting the first transmission on a frequency resource that has been modified in frequency domain from an allocated frequency resource by a shifting factor, or transmitting the first transmission on the allocated frequency resource and power scaling at least one resource element of the allocated resource.

An embodiment may be directed to an apparatus, which may include at least one processor and at least one memory comprising computer program code. The at least one memory and computer program code are configured, with the at least one processor, to cause the apparatus at least to: transmit a first transmission to a network node and to indicate at least one type of the apparatus. To indicate the at least one type of the apparatus, the at least one memory and computer program code are configured, with the at least one processor, to cause the apparatus to at least one of transmit the first transmission on a frequency resource that has been modified in frequency domain from an allocated frequency resource by a shifting factor, or transmit the first transmission on the allocated frequency resource and power scale at least one resource element of the allocated resource.

An embodiment may be directed to a method, which may include receiving, at a network node, a first transmission from a user equipment. The receiving may include at least one of: receiving the first transmission on a frequency resource that has been modified from an allocated frequency resource by a shifting factor, or receiving the first transmission on the allocated frequency resource, wherein at least one resource element of the allocated resource is power scaled.

An embodiment may be directed to an apparatus, which may include at least one processor and at least one memory comprising computer program code. The at least one memory and computer program code are configured, with the at least one processor, to cause the apparatus at least to: receive a first transmission from a user equipment. The first transmission is at least one of received on a frequency resource that has been modified from an allocated frequency resource by a shifting factor, or received on the allocated frequency resource such that at least one resource element of the allocated resource is power scaled.

An embodiment may be directed to an apparatus, which may include means for transmitting a first transmission to a network node and means for indicating at least one type of the apparatus. The means for indicating may include at least one of means for transmitting the first transmission on a frequency resource that has been modified in frequency domain from an allocated frequency resource by a shifting factor, or means for transmitting the first transmission on the allocated frequency resource and power scaling at least one resource element of the allocated resource.

An embodiment may be directed to an apparatus, which may include means for receiving a first transmission from a user equipment. The means for receiving comprises at least one of: means for receiving the first transmission on a frequency resource that has been modified from an allocated frequency resource by a shifting factor, or means for receiving the first transmission on the allocated frequency resource, wherein at least one resource element of the allocated resource is power scaled.

BRIEF DESCRIPTION OF THE DRAWINGS

For proper understanding of example embodiments, reference should be made to the accompanying drawings, wherein.

DETAILED DESCRIPTION

Figure 1:
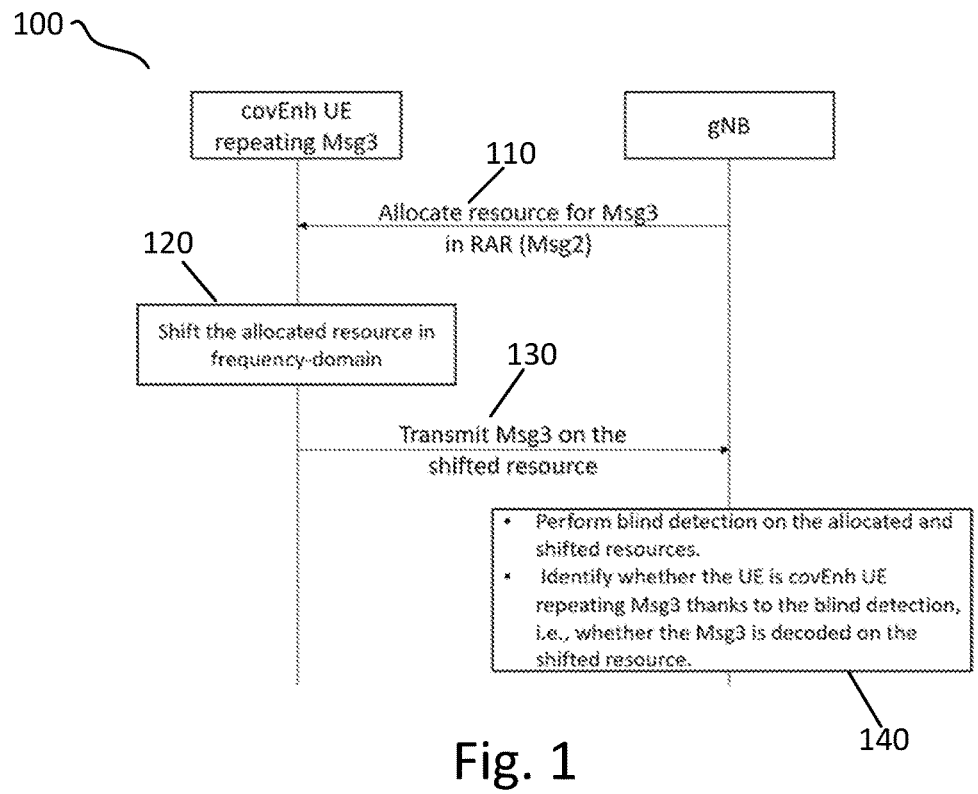
FIG. 1 illustrates an example signaling diagram, according to one embodiment.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for differentiating between UEs having different capabilities, such as between legacy and new user equipment (UE), e.g., those capable of Type A Msg3 repetitions, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

A contention-based random access (RACH) procedure may include four messages signaled between a UE and network node (e.g., gNB). For example, the UE may transmit a contention-based physical random access channel (PRACH) preamble, which is known as Msg1. After detecting the preamble, the network node may respond with a random-access response (RAR), which is known as Msg2. The RAR can include the detected preamble ID, a time-advance command, a temporary cell radio network temporary identifier (C-RNTI), and an uplink (UL) grant for scheduling a physical uplink shared channel (PUSCH) transmission from the UE. This PUSCH transmission is referred to as Msg3. The UE may transmit Msg3 in response to receiving the RAR including an ID for contention resolution. After receiving Msg3, the network node may transmit the contention resolution message, or Msg4, with the contention resolution ID. After receiving Msg4, the UE may send an acknowledgement on a PUCCH if the UE finds its contention resolution ID in the Msg4.

Additionally, a two-step RACH procedure has been introduced for NR. This two-step RACH procedure includes two messages, which are referred to as MsgA and MsgB. In the two-step RACH procedure, MsgA combines the random access preamble signal (Msg1) and the PUSCH transmission (Msg3), and MsgB combines the RAR (Msg2) and the contention resolution (Msg4). Thus, two-step RACH procedure includes two steps for carrying out a complete contention-based random access (CBRA).

For Type A Msg3 PUSCH repetition, different options are being considered. One option is that a gNB schedules Msg3 PUSCH repetition(s) without a UE request, and without knowing whether the UE is capable to perform Msg3 repetitions. It is noted that coverage enhanced (covEnh) UEs are capable of Msg3 repetitions, while legacy UEs are not capable of Msg3 repetitions. According to this option, the gNB would decide whether to schedule Msg3 PUSCH repetition and, if scheduled, the gNB decides the number of repetitions. A UE that supports Msg3 PUSCH repetition may transmit Msg3 PUSCH with repetition as indicated by the gNB and may use, e.g., separate demodulation reference signal (DMRS) configuration or uplink control information (UCI) multiplexing with Msg3 PUSCH. The gNB may then blindly decode Msg3 PUSCH with two different assumptions of with repetition and without repetition.

Hence, the state-of-the-art Msg3 scheduling mechanism does not allow for triggering and/or configuring Msg3 repetitions. In this situation, the gNB configures Msg3 repetitions obliviously as to capability of UEs of actually repeating Msg3. When receiving the first instance of Msg3 over a resource configured for Msg3 repetitions, the gNB does not yet know if further instances of Msg3, i.e., the configured repetitions, will take place or not.

Therefore, a problem arises with respect to how the gNB knows, when receiving a first Msg3 transmission from the UE, whether repetitions are coming. Indeed, an oblivious gNB would need to be able to differentiate between the Msg3 transmission performed by a UE that is repeating Msg3, as per configuration, and the Msg3 transmission performed by a legacy UE that would not be followed by further Msg3 repetitions. Without knowing whether it is receiving repeating Msg3, the gNB needs to wait until the end of scheduled repetitions. This results in poor spectrum usage and unnecessary delays to the legacy UEs.

As will be discussed in detail below, some example embodiments can provide a solution to at least the problems discussed above, as well as other possible challenges, thereby improving spectrum usage and reducing delays, for example.

Some example embodiments may provide a set of solutions based on at least two approaches for differentiating between legacy UEs and coverage enhanced (covEnh) UEs capable of repeating Msg3, i.e., the UEs that support 3GPP Release-17 type A Msg3 repetition and/or between reduced capability UEs and normal capability UEs, wherein a reduced capability may be a UE with a smaller number of transceiver units and/or a smaller operational bandwidth than a normal capability UE. The reduced capability UE and the normal capability UE may or may not capable of repeating Msg3. These approaches may generally be referred to herein as subcarrier frequency shifting and resource element(s) power scaling (e.g., blanking), respectively. It should be noted that, in some embodiments, the approaches are not necessarily mutually exclusive and can be combined, as discussed below.

A resource element (RE) is a physical resource that includes one subcarrier during one orthogonal frequency division multiplex (OFDM) symbol. REs are grouped in physical resource blocks (PRBs) in frequency domain Each PRB includes a plurality of subcarriers, e.g., 12 subcarriers. A subcarrier refers to a resource in a frequency domain.

An example embodiment may utilize modified frequency domain resource to differentiate between two UEs types with different capabilities, such as legacy and covEnh UEs or reduced capability UEs and normal capability UEs. In one embodiment, a covEnh UE and/or a reduced capability UE does not perform a first transmission (e.g., Msg3 transmission) on the allocated resource, but on a modified or shifted resource. For example, the resource may be shifted either up or down in the frequency domain from the allocated resource by a shifting factor. In some example embodiments, the modified frequency domain resource may be used to differentiate among more than two UE types with different capabilities. The modified resource may be shifted both up and down depending on the UE type. In this case, one UE type may not use the resource that is both shifted up and down at the same time. For example, the covEnh UEs may use the resource that is shifted up, the reduced capability UEs may use the resource that is shifted down or vice versa, and the legacy and normal capability UEs may use the allocated resource without shifting. According to certain embodiments, the shifting factor may be a fraction, one, or multiple of subcarriers. Different options may be provided for determining the shifting factor, as discussed in more detail below.

In certain embodiments, the gNB may perform decoding first on the allocated resource and if decoding is successful, then the gNB knows the UE type and/or that there will be no further transmissions or repetitions (e.g., Msg3 repetitions). In case decoding fails, the gNB may attempt decoding on at least one allowable shifted resource. If decoding is successful, then the gNB knows that there will be further transmissions or repetitions. In some embodiments, the further transmissions can use either the resources allocated for the further transmissions or the modified resources. The use of the modified resources for the further transmissions can avoid the change of frequency error correction (FOC) between transmissions.

In certain embodiments, the gNB may perform decoding first on the allocated resource and if decoding is successful, then the gNB knows that the UE belongs to at least one UE type and/or that there will be no further transmissions or repetitions (e.g., Msg3 repetitions). In case decoding fails, the gNB may attempt decoding on at least one allowable shifted resource (e.g., a resource shifted up or down). If decoding is successful, then the gNB knows the UE type and that there will be further transmissions or repetitions or that there will be no further transmission or repetitions. In case decoding still fails, the gNB may attempt decoding on the remaining allowable shifted resource. If decoding is successful, then the gNB knows that there will be further transmissions or repetitions or that there will be no further transmission or repetitions. In some embodiments, the further transmissions can use either the resources allocated for the further transmissions or the modified resources. The use of the modified resources for the further transmissions can avoid the change of frequency error correction (FOC) between transmissions.

An example embodiment may utilize resource element power scaling to differentiate between UEs with different capabilities, such as legacy and covEnh UEs. In one example embodiment, a covEnh UE may perform a first transmission (e.g., first Msg3 transmission) on the allocated resource, but can power scale at least one resource element (RE) of the allocated resource. For example, power scaling may refer to transmitting a blanked RE using zero-power or using a different transmit power from the current transmit power. In an example embodiment, the current transmit power may be scaled using a fixed or configured offset power value (e.g., by subtracting since a maximum transmit power may already be applied) to produce the different transmit power. In this case, according to certain embodiments, the gNB may detect that certain RE(s) are power scaled or blanked and thus the gNB knows that further transmissions, such as Msg3 repetitions, are expected. Due to the power scaled or blanked RE(s), decoding of the first transmission might not be successful, but when combined with the further transmissions (e.g., Msg3 repetitions) it still assists in decoding the transmission(s) correctly.

An example embodiment may utilize the modified frequency domain resource to differentiate between reduced capability UEs and the normal capability UEs, and may utilize the resource element power scaling to further differentiate whether the reduced capability UE and/or the normal capability UE is also a covEnh UE that supports Msg3 repetition, i.e., whether there are repetitions that follow the first transmission.

An example embodiment may utilize the modified frequency domain resource to differentiate between covEnh UE that supports Msg3 repetition and legacy UE that does not support Msg3 repetition, and may utilize the resource element power scaling to further differentiate whether the covEnh UE and/or the normal capability UE is also a reduced capability UE.

Thus, certain example embodiments may include approaches, such as frequency shifting and resource element power scaling, which are based on how a Msg3 transmission is actually performed by a covEnh UE repeating Msg3 over the configured time/frequency resources. In this regard, it is noted that such time/frequency resources are configured by a gNB irrespective of whether the recipient of the configuration is a covEnh UE which will repeat Msg3 or a legacy UE which will not repeat Msg3. However, example embodiments provide a gNB with a constructive means to differentiate between the two types of UEs. It is noted that, while certain embodiments are described herein with reference to Msg3 repetitions, example embodiments are not limited to Msg3 repetitions and can be applied to other types of message repetitions.

FIG. 1 illustrates a signaling diagram 100 depicting an example of the indication and identification of a covEnh UE, based on frequency shifting, according to one embodiment. As illustrated in the example of FIG. 1, at 110, a gnB may transmit a RAR (Msg2) allocating resource(s) for Msg3 to a covEnh UE capable of repeating Msg3. As further illustrated in the example of FIG. 1, at 120, the UE may indicate that it is a covEnh UE repeating Msg3 by shifting the allocated resource in frequency domain and, at 130, may transmit Msg3 on the shifted resource. The gNB may receive Msg3 on the shifted resource and, at 140, may perform blind detection on the allocated and shifted resources to identify whether the UE is a covEnh UE repeating Msg3 or a legacy UE that, by specification, cannot repeat Msg3. It is noted that, in an embodiment, if a covEnh UE is not configured for Msg3 repetitions, then such a UE would not apply the frequency shift.

In certain embodiments, the gNB may perform the blind detection by first attempting to decode Msg3 on the allocated resources for a potential Msg3 repetition. If the gNB identifies that Msg3 is transmitted on the allocated resource, then the gNB can determine that the UE is legacy UE and stop the blind detection procedure. Otherwise, if the gNB determines that Msg3 is not transmitted on the allocated resource, the gNB may continue decoding on the shifted resource and may determine that the UE is a covEnh UE. For example, the gNB may determine that Msg3 is not transmitted on the allocated resource by measuring higher than discontinuous transmission (DTX)/discontinuous reception (DRX) threshold energy in the Msg3 REs but still failing the cyclic redundancy check (CRC) test of decoding. However, the blind detection can also take place without this observation.

As described above, FIG. 1 is provided as one example Other examples are possible, according to some embodiments.

Figure 2:
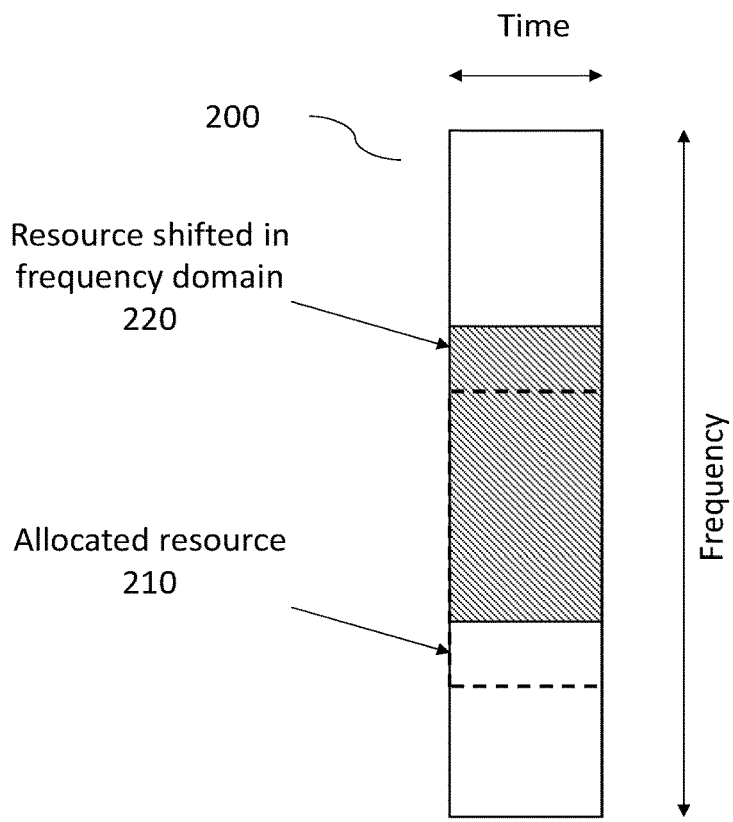
FIG. 2 illustrates an example diagram of a resource shifted in frequency domain, according to an embodiment.

FIG. 2 illustrates an example 200 of an allocated resource 210 that is modified or shifted in frequency domain, thereby resulting in a shifted resource 220, according to one example embodiment. In certain example embodiments, the shifted resource 220 and allocated resource may be at least partially overlapping. For example, in some embodiments, the shifting of the shifted resource 220 may be small when compared to the bandwidth of the allocated resource 210. Some example embodiments may provide several ways to define the shifting factor (i.e., the amount of frequency shift of the shifted resource) depending on the granularity. In one example embodiment, the shifting factor can be expressed as one or multiple subcarriers. According to an embodiment, the shifting factor can be expressed as one or multiple fractions of a subcarrier, where a faction of a subcarrier can be, e.g., a half of a subcarrier.

Certain example embodiments may provide several possibilities for the indication of the shifting factor. For example, the shifting factor may be hard coded in the specification. Additionally or alternatively, a list of shifting factors can be specified and information on which factor to be used may be conveyed to the UE via higher-layer signaling, e.g., a radio resource control (RRC) message, system information (SI), system information block 1 (SIB1), remaining system information (RMSI), etc. In one embodiment, the shifting factor can be calculated as a function of subcarrier spacing. For example, $$\text{shifting factor} = 15 * \frac{2^\mu}{N} \text{ kHz,}$$

where μ=0, 1, 2, 3 corresponds to subcarrier spacing (SCS)=15, 20, 60 and 120 kHz, respectively. In an embodiment, N can be hard coded in the specification, e.g., N=2, which leads to 7.5 kHz shifting factor in case SCS=15 kHz. Additionally or alternatively, N can also be provided to the UE via higher-layer signaling, e.g., RRC message, SI, SIB1 or RMSI, or the like.

In certain embodiments, the shifting in frequency-domain may be performed in at least two ways. For example, the allocated resource can be "shifted up" by shifting the frequency domain resource allocation (FDRA) by a positively valued shifting factor, or the allocated resource can be "shifted down" by shifting the FDRA by a negatively valued shifting factor.

From the blind detection perspective, considering either "shifting up" or "shifting down" can be a wise approach since this can limit the maximum blind detection attempts at the gNB. In one embodiment, the gNB may indicate to the UE whether the shifting should be done by "shifting up" or "shifting down". According to certain embodiments, this indication can be done via broadcast higher-layer signalling, e.g., SIB1 or RMSI, or via UL grant, e.g., medium access control (MAC) RAR.

As described above, FIG. 2 is provided as an example. Other examples are possible, according to some embodiments.

Figure 3:
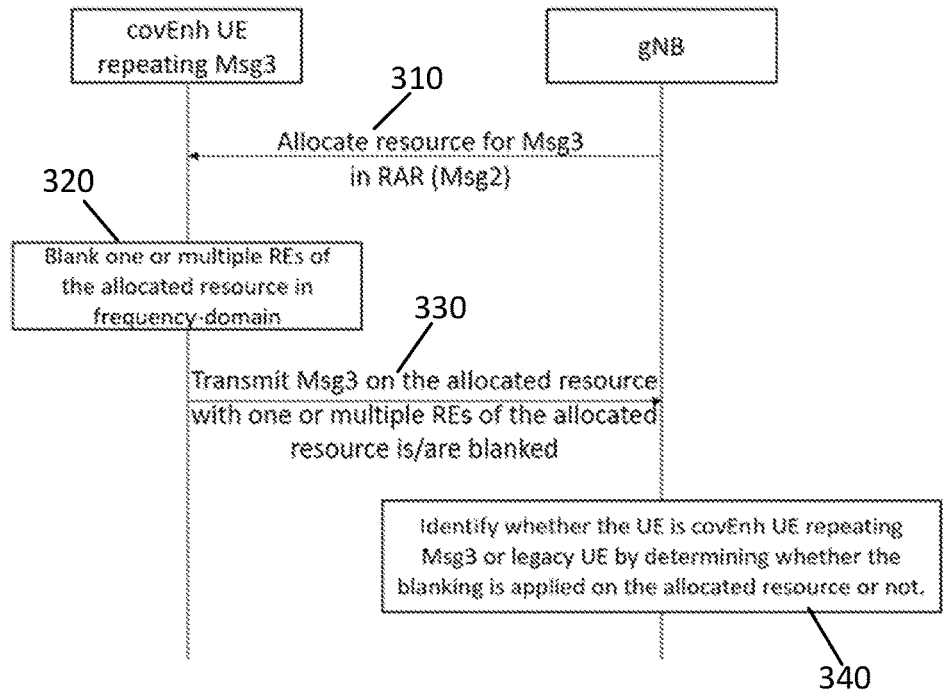
FIG. 3 illustrates an example signaling diagram, according to an embodiment.

FIG. 3 illustrates a signaling diagram 300 depicting an example of the indication and identification of a covEnh UE, based on RE(s) blanking, according to one embodiment. As illustrated in the example of FIG. 3, at 310, a gnB may transmit a RAR (Msg2) allocating resource(s) for Msg3 to a covEnh UE capable of repeating Msg3. As further illustrated in the example of FIG. 3, at 320, the UE may indicate that it is a covEnh UE repeating Msg3 by blanking one or multiple REs of the allocated resource. At 330, the UE may transmit Msg3 on the allocated resource with one or more REs of the allocated resource being blanked. The gNB may receive Msg3 and, at 340, may identify whether the UE is a covEnh UE repeating Msg3 or a legacy UE by determining whether the blanking is applied or not.

According to certain embodiments, the blanking can be performed in several ways. In one embodiment, the UE can rate-match around the blanked REs. In a further embodiment, the UE can transmit the blanked REs using zero-power without rate-matching around the blanked REs. The effective coding rate is reduced in this case. However, this blanking/UE types differentiation is applied for just the first instance of the Msg3 transmission and, therefore, this loss can largely be compensated and exceeded by the effective coding rate brought by Msg3 repetitions. In addition, "blanking" may also mean that the UE can transmit the blanked REs using different transmit power, e.g., by scaling current transmit power using a fixed or configured offset power value (e.g., by subtracting since maximum Tx power may already be applied). This would entail a negligible power difference across different Msg3 repetitions, while conveying information to the gNB nonetheless.

Figure 4:
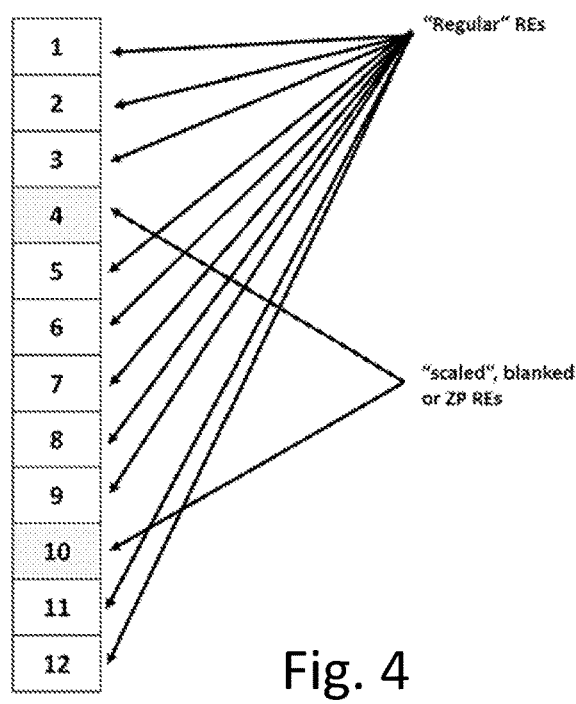
FIG. 4 illustrates an example diagram of blanking resource element(s), according to one embodiment.

FIG. 4 illustrates a graphical example 400 of blanking, where 1 PRB of PUSCH symbol for Msg3 is illustrated. FIG. 4 is provided as one example. Other examples are possible, according to some embodiments.

According to some example embodiments, both the gNB and the UE can have the same understanding of the position(s) of the blanked RE(s) so that the gNB can identify whether the blanking is applied or not. Therefore, in certain embodiments, position(s) of the blanked RE(s) may be hard coded in the specification or the gNB can signal this information to the UE. For example, a list of blanking positions and/or patterns can be specified and the gNB may indicate, for example, via higher-layer signalling, e.g., SIB1 or RMSI, which of the positions/patterns should be applied.

Additionally, similar to the position(s) of the blanked RE(s), the scaling value may also be hard coded in the specification or can be provided to the UE via broadcast higher-layer signalling, e.g. SIB1 or RMSI.

Figure 5A:
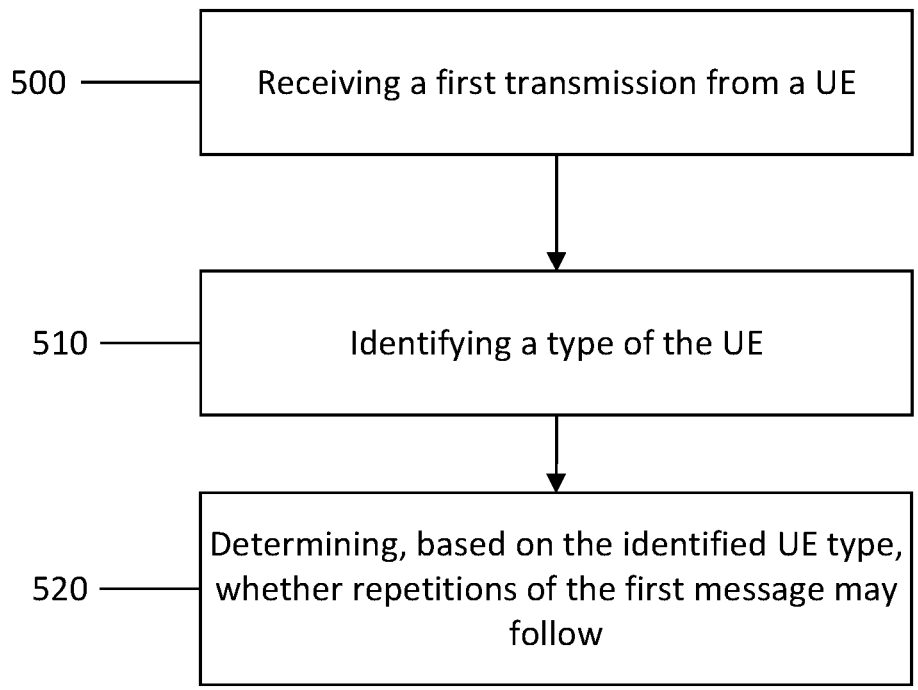
FIG. 5A illustrates an example flow diagram of a method, according to an embodiment.

FIG. 5A illustrates an example flow diagram of a method for differentiating between covEnh UEs and legacy UEs, e.g., based on type A Msg3 repetitions, according to an example embodiment. In certain example embodiments, the flow diagram of FIG. 5A may be performed by a network entity or network node in a communications system, such as LTE or 5G NR. In some example embodiments, the network entity performing the method of FIG. 5A may include or be included in a base station, access node, node B, eNB, gNB, NG-RAN node, transmission-reception points (TRPs), high altitude platform stations (HAPS), relay station or the like. In one embodiment, the network node performing the method of FIG. 5A may include a gNB or similar radio node. As such, some of the operations illustrated in FIG. 5A may be similar to some operations shown in, and described with respect to the gNB depicted in FIG. 1 and/or FIG. 3.

As illustrated in the example of FIG. 5A, the method may include, at 500, receiving a first transmission, such as a Msg3 transmission or other type of message, from a UE. According to certain embodiments, the receiving 500 may include receiving the first transmission on a frequency resource that has been modified in frequency domain from an allocated frequency resource by a shifting factor, and/or the receiving 500 may include receiving the first transmission on the allocated frequency resource where at least one resource element of the allocated resource is power scaled. In one embodiment, the modified frequency resource may include a frequency resource that has been shifted up or down from the allocated frequency resource by the shifting factor. In certain embodiments, based on receiving the first transmission on the frequency resource that has been shifted or receiving the first transmission with the blanking of the at least one resource element of the allocated resource, the method may include, at 510, identifying a type of the UE. For instance, the type of the UE may include a covEnh UE that supports type A Msg3 repetitions or a reduced capability UE or legacy UE.

According to an embodiment, the method of FIG. 5A may include, at 520, determining, based on the identified UE type, whether one or more further transmissions may follow the first transmission. For example, the further transmission may include one or more repetitions of the first transmission, such as Msg3 repetitions. In some embodiments, if it is determined that repetitions will Follow the first transmission, the method may include receiving the Msg3 repetitions (e.g., $2^{nd}$, $3^{rd}$, . . . nth transmissions).

According to an embodiment, the receiving 500 may include receiving a configuration of the one or more further transmissions. In an example embodiment, the determining 520 may include performing blind detection on the allocated frequency resource and the modified frequency resource, and/or the identifying 510 may include determining that the UE is a covEnh UE and/or a reduced capability UE when the first transmission is decoded on the modified resource.

According to some embodiments, the shifting factor may include at least one of: one or multiple of subcarriers, or a fraction of the subcarrier spacing. In certain embodiments, the shifting factor may be at least one of: specified hard-coded, calculated as a function of subcarrier spacing, or selected from a list of shifting factors provided to the UE by broadcast higher-layer signaling, such as SI, SIB1, RMSI, etc.

According to one example embodiment, although not illustrated in the example of FIG. 5A, the method may include broadcasting, via higher-layer signaling, information on whether the frequency resource should be shifted by at least one of adding or subtracting in frequency-domain the allocated resource by the shifting factor whether the UE may select either adding or subtracting to perform the shifting of the frequency resource.

FIG. 5A is provided as one example method. Other examples are possible according to some embodiments, and FIG. 5A may include one or more additional aspects described above or elsewhere herein.

Figure 5B:
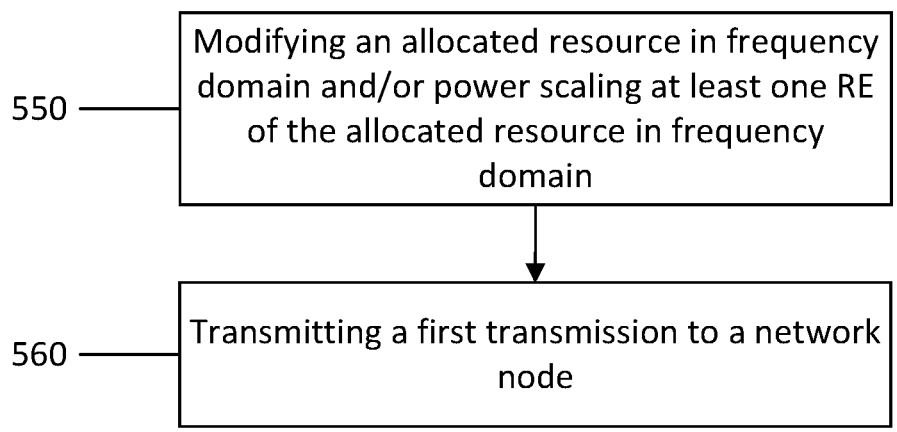
FIG. 5B illustrates an example flow diagram of a method, according to an embodiment.

FIG. 5B illustrates an example flow diagram of a method for indicating UE type, e.g., whether a UE is capable of Msg3 repetitions, according to one embodiment. In certain example embodiments, the flow diagram of FIG. 5B may be performed by a network entity or network node in a communications system, such as LTE or 5G NR. In some example embodiments, the network entity performing the method of FIG. 5B may include or be included in UE, communication node, mobile equipment (ME), mobile station, mobile device, stationary device, IoT device, or other device. As such, some of the operations illustrated in FIG. 5B may be similar to some operations shown in, and described with respect to the UE depicted in FIG. 1 and/or FIG. 3.

As illustrated in the example of FIG. 5B, the method may include, at 550, modifying an allocated resource in frequency domain and/or power scaling at least one RE of the allocated resource in frequency domain. For example, in an embodiment, the modifying of the allocated resource may include shifting the frequency resource up or down from the allocated frequency resource. According to one embodiment, the power scaling of the at least one RE of the allocated resource may include transmitting the at least one RE using zero-power (e.g., blanking) and/or using a transmit power that is scaled from the current transmit power.

In an embodiment, the method may include, at 560, transmitting a first transmission to a network node, where it is indicated whether one or more further transmissions follow the first transmission by transmitting the first transmission on the frequency resource that has been modified in frequency domain from the allocated frequency resource by a shifting factor, or by transmitting the first transmission on the allocated frequency resource such that at least one RE of the allocated resource is power scaled. In certain embodiments, the first transmission may include a Msg3 transmission and the one or more further transmissions may include repetitions of the Msg3 transmission. According to some embodiments, the transmitting 560 may further include indicating a configuration of the one or more further transmissions.

According to some embodiments, a type of the UE is indicated based on the transmitting of the first transmission on the frequency resource that has been shifted up or down from the allocated frequency resource or based on the transmitting of the first transmission with the blanking of the at least one RE of the allocated resource. For example, the type of the UE may include a covEnh UE that supports type A Msg3 repetitions. Another type of UE may include a reduced capability UE that has at least one limited functionality compared to a normal capability UE. For example, a reduced capability may be a UE with a smaller number of transceiver units and/or a smaller operational bandwidth than a normal capability UE.

According to some embodiments, the shifting factor may include one or multiple of subcarriers, and/or the shifting factor may include a fraction of the subcarrier spacing. In certain embodiments, the shifting factor may be at least one of: specified hard-coded, calculated as a function of subcarrier spacing, or selected from a list of shifting factors provided to the UE by broadcast higher-layer signaling.

In certain embodiments, the modifying 550 may include shifting the frequency resource by adding and/or subtracting in frequency-domain the allocated resource by the shifting factor. According to some embodiments, although not illustrated in the example of FIG. 5B, the method may include receiving, via broadcast higher-layer signaling, information on whether the frequency resource should be shifted by adding or subtracting or whether the UE may select either adding or subtracting to perform the shifting of the frequency resource.

FIG. 5B is provided as one example method. Other examples are possible according to some embodiments, and FIG. 5B may include one or more additional aspects described above or elsewhere herein.

Figure 6A:
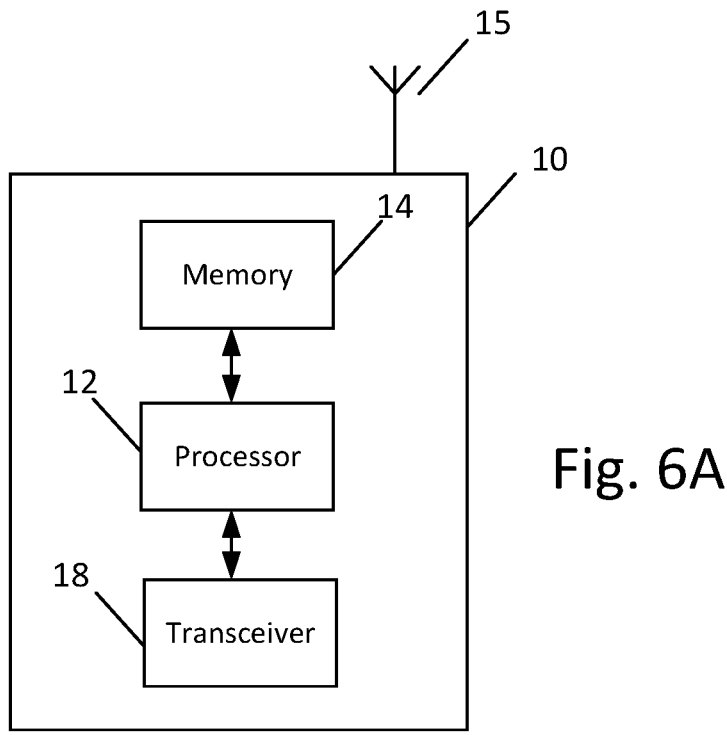
FIG. 6A illustrates an example block diagram of an apparatus, according to an embodiment.

FIG. 6A illustrates an example of an apparatus 10 according to an embodiment. In an embodiment, apparatus 10 may be a node, host, or server in a communications network or serving such a network. For example, apparatus 10 may be a network node, a sensing node, satellite, base station, a Node B, an evolved Node B (eNB), 5G Node B or access point, next generation Node B (NG-NB or gNB), TRP, HAPS, integrated access and backhaul (IAB) node, and/or a WLAN access point, associated with a radio access network, such as a LTE network, 5G or NR. In some example embodiments, apparatus 10 may be gNB or other similar radio node, for instance.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 6A.

As illustrated in the example of FIG. 6A, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, or any other processing means, as examples. While a single processor 12 is shown in FIG. 6A, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media, or other appropriate storing means. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15, or may include any other appropriate transceiving means. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (via an uplink, for example).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device), or an input/output means.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry/means or control circuitry/means. In addition, in some embodiments, transceiver 18 may be included in or may form a part of transceiver circuitry/means.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network element or RAN node, such as a base station, access point, Node B, eNB, gNB, TRP, HAPS, IAB node, WLAN access point, or the like. In one example embodiment, apparatus 10 may be a gNB or other radio node. According to certain embodiments, apparatus 10 may be controlled by memory 14 and processor 12 to perform the functions associated with any of the embodiments described herein. For example, in some embodiments, apparatus 10 may be configured to perform one or more of the processes depicted in any of the flow charts or signaling diagrams described herein, such as those illustrated in FIG. 1, FIG. 3 or FIG. 5A, or any other method described herein. In some embodiments, as discussed herein, apparatus 10 may be configured to perform a procedure relating to identifying UE type, e.g., for Msg3 repetitions, as discussed elsewhere herein, for example.

Figure 6B:
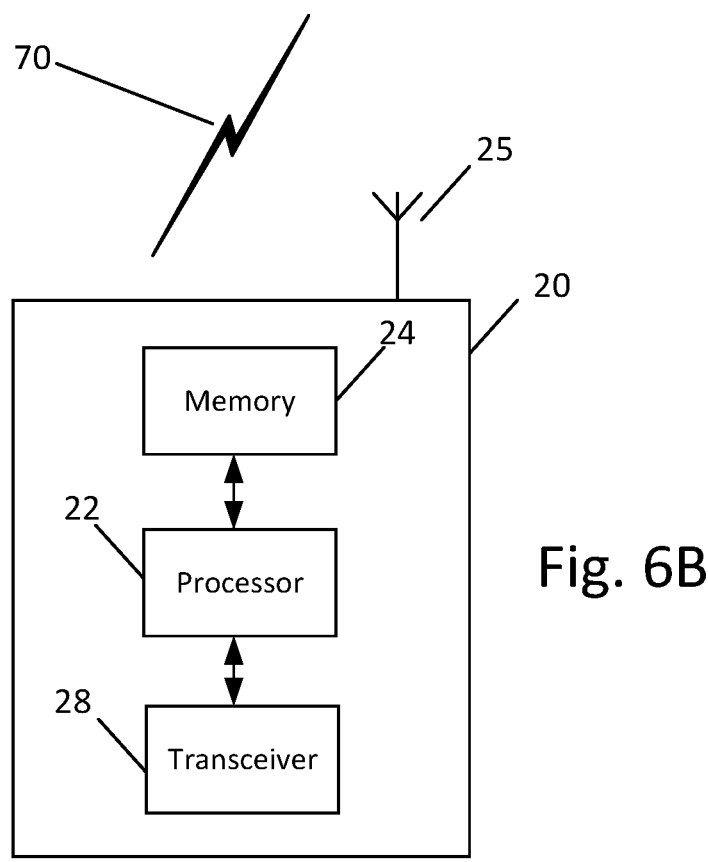
FIG. 6B illustrates an example block diagram of an apparatus, according to an embodiment.

FIG. 6B illustrates an example of an apparatus 20 according to another embodiment. In an embodiment, apparatus 20 may be a node or element in a communications network or associated with such a network, such as a UE, communication node, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 6B.

As illustrated in the example of FIG. 6B, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 6B, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, SL UE, relay UE, mobile device, mobile station, ME, IoT device and/or NB-IoT device, or the like, for example. According to certain embodiments, apparatus 20 may be controlled by memory 24 and processor 22 to perform the functions associated with any of the embodiments described herein, such as one or more of the operations illustrated in, or described with respect to, FIG. 1, 3 or 5B, or any other method described herein. For example, in an embodiment, apparatus 20 may be controlled to perform a process relating to indicating or determining a UE type, e.g., via capability of transmitting type A Msg3 repetitions, as described in detail elsewhere herein.

In some embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of the operations.

In view of the foregoing, certain example embodiments provide several technological improvements, enhancements, and/or advantages over existing technological processes and constitute an improvement at least to the technological field of wireless network control and/or management. For example, as discussed in detail above, certain embodiments provide an approach for differentiating between UEs having different capabilities, such as coverage enhanced and legacy UEs, for instance, in order for a gNB to be able to detect, when receiving a first Msg3 transmission from a UE, whether Msg3 repetitions are forthcoming. Since, according to certain embodiments, a gNB does not need to wait until the end of scheduled repetitions to identify the Msg3 repetitions, example embodiments can provide improved spectrum usage and reduce delays to legacy UEs. Accordingly, the use of certain example embodiments results in improved functioning of communications networks and their nodes, such as base stations, eNBs, gNBs, and/or IoT devices, UEs or mobile stations.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein may apply to both singular and plural implementations, regardless of whether singular or plural language is used in connection with describing certain embodiments. For example, an embodiment that describes operations of a single network node may also apply to embodiments that include multiple instances of the network node, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

We claim:

1. A method, comprising:
transmitting, by a user equipment, a first transmission to a network node; and
indicating at least one type of the user equipment,
wherein the indicating comprises at least one of transmitting the first transmission on a frequency resource that has been modified in frequency domain from an allocated frequency resource by a shifting factor, or transmitting the first transmission on the allocated frequency resource and power scaling at least one resource element of the allocated resource, and
wherein the power scaling of the at least one resource element of the allocated resource comprises transmitting the at least one resource element using zero-power or using a transmit power that is scaled from a current transmit power.

2. The method of claim 1, wherein the indicating further comprises indicating whether one or more further transmissions follow the first transmission based on the transmitting of the first transmission on a frequency resource that has been modified in frequency domain from an allocated frequency resource or based on the transmitting of the first transmission with the power scaling of the at least one resource element of the allocated resource.

3. The method of claim 2, wherein the further transmissions comprise one or more repetitions of the first transmission.

4. The method of claim 2, wherein the first transmission comprises a Msg3 transmission.

5. The method of claim 1, wherein the modified frequency resource comprises a frequency resource that has been shifted up or down from the allocated frequency resource.

6. An apparatus, comprising:
at least one processor; and
at least one memory comprising computer program code,
the at least one memory and computer program code are configured, with the at least one processor, to cause the apparatus at least to:
transmit a first transmission to a network node; and
indicate at least one type of the apparatus,
wherein, to indicate the at least one type of the apparatus, the at least one memory and computer program code are configured, with the at least one processor, to cause the apparatus to at least one of transmit the first transmission on a frequency resource that has been modified in frequency domain from an allocated frequency resource by a shifting factor, or transmit the first transmission on the allocated frequency resource and power scale at least one resource element of the allocated resource, and
wherein, to power scale the at least one resource element of the allocated resource, the at least one memory and computer program code are configured, with the at least one processor, to cause the apparatus at least to transmit the at least one resource element using zero-power or using a transmit power that is scaled from a current transmit power.

7. The apparatus of claim 6, wherein, to indicate the at least one type of the apparatus, the at least one memory and computer program code are configured, with the at least one processor, to cause the apparatus at least to indicate whether one or more further transmissions follow the first transmission based on the transmitting of the first transmission on a frequency resource that has been modified in frequency domain from an allocated frequency resource or based on the transmitting of the first transmission with the power scaling of the at least one resource element of the allocated resource.

8. The apparatus of claim 7, wherein the further transmissions comprise one or more repetitions of the first transmission.

9. The apparatus of claim 7, wherein the at least one memory and computer program code are configured, with the at least one processor, to cause the apparatus at least to indicate a configuration of the one or more further transmissions.

10. The apparatus of claim 6, wherein the modified frequency resource comprises a frequency resource that has been shifted up or down from the allocated frequency resource.

11. The apparatus of claim 6, wherein the type of the apparatus comprises at least one of a coverage enhanced user equipment that supports type A Msg3 repetitions or a reduced capability user equipment.

12. The apparatus of claim 6, wherein the first transmission comprises a Msg3 transmission.

13. The apparatus of claim 6, wherein the shifting factor comprises at least one of:
one or multiple of subcarriers; or
a fraction of the subcarrier spacing.

14. The apparatus of claim 6, wherein the shifting factor is at least one of:
specified hard-coded,
calculated as a function of subcarrier spacing, or
selected from a list of shifting factors received by the apparatus via broadcast higher-layer signaling.

15. The apparatus of claim 6, wherein the frequency resource is shifted by at least one of adding or subtracting in frequency-domain the allocated resource by the shifting factor.

16. The apparatus of claim 15, wherein the at least one memory and computer program code are configured, with the at least one processor, to cause the apparatus at least to receive, via broadcast higher-layer signaling, information on whether the frequency resource should be shifted by adding or subtracting or whether the user equipment may select either adding or subtracting or information on which UE type is associated with frequency resource shifted by adding or subtracting.

17. An apparatus, comprising:
at least one processor; and
at least one memory comprising computer program code,
the at least one memory and computer program code are configured, with the at least one processor, to cause the apparatus at least to:
receive a first transmission from a user equipment; and
wherein the first transmission is at least one of received on a frequency resource that has been modified from an allocated frequency resource by a shifting factor, or received on the allocated frequency resource such that at least one resource element of the allocated resource is power scaled, and
wherein, when the first transmission is received on the on the allocated frequency resource such that the at least one resource element of the allocated resource is power scaled, the at least one memory and computer program code are configured, with the at least one processor, to cause the apparatus at least to receive the at least one resource element on zero-power or a transmit power that is scaled from a current transmit power.

18. The apparatus of claim 17, wherein the at least one memory and computer program code are configured, with the at least one processor, to cause the apparatus at least to, based on the receiving of the first transmission, determine whether one or more further transmissions follow the first transmission.

\* \* \* \* \*